UNITED STATES PATENT OFFICE.

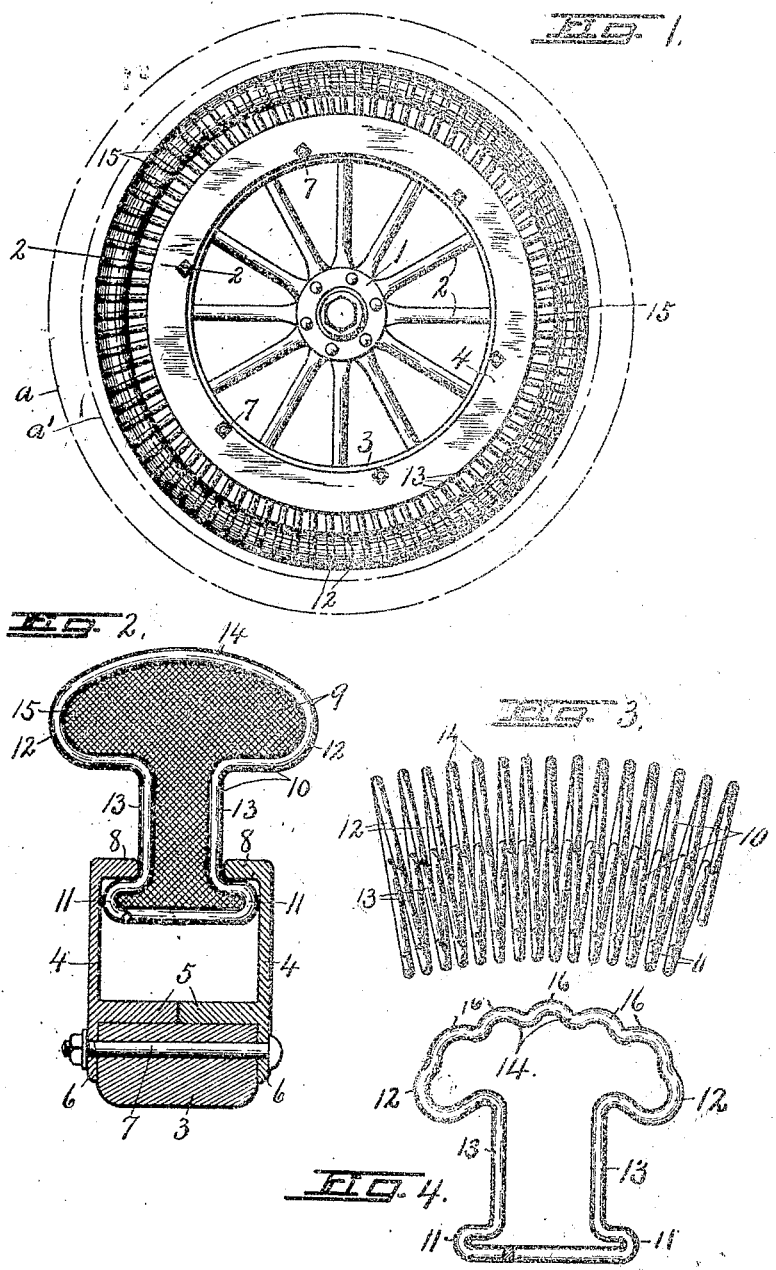

HENRY J. STEIGERWALD, OF AUBURN, NEW YORK.

VEHICLE-WHEEL.

1,199,440.

Specification of Letters Patent.

Patented Sept. 26, 1916.

Application filed February 28, 1916. Serial No. 80,913.

*To all whom it may concern:*

Be it known that I, HENRY J. STEIGERWALD, a citizen of the United States of America, and resident of Auburn, in the county of Cuyuga, in the State of New York, have invented new and useful Improvements in Vehicle-Wheels, of which the following, taken in connection with the accompanying drawings, is a full, clear, and exact description.

This invention relates to certain improvements in vehicle wheels, and refers more particularly to the tire and means for attaching the same to the rim.

The main object is to provide a simple, yet strong, durable and efficient substitute for the usual pneumatic tire and to thereby avoid the punctures, blowouts and other more or less dangerous factors incidental to the use of such pneumatic tire. In other words, I have sought to provide a commercially practicable tire having all of the resilient qualities of an ordinary pneumatic tire without the use of pneumatics as an inflating medium.

Other objects and uses relating to specific parts of the device will be brought out in the following description.

In the drawings—Figure 1 is a side elevation of a wheel embodying the features of my invention, the dotted concentric lines surrounding the tire indicating the position which the circumferentially extending coil spring assumes when released from interlocking engagement with the rim. Fig. 2 is an enlarged transverse sectional view taken on line 2—2, Fig. 1. Fig. 3 is a side view of a portion of the coil spring forming the main body of the tire. Fig. 4 is a view of one coil of the spring, in which the tread portion is fluted or corrugated.

As illustrated, this wheel comprises a hub —1— and spokes —2— connecting the hub with a suitable felly —3—. Surrounding the periphery of the felly is a metal rim composed of circular sections —4— having laterally projecting flanges —5— resting upon the periphery of said felly, and also provided with radially projecting annular flanges —6— engaging the sides of the felly and secured thereto by bolts —7—. The outer edges of the rim sections —4— are spaced apart transversely and provided with inturned annular flanges —8— for receiving and retaining a tire, as —9—. This tire comprises a spring wire coil —10— extending circumferentially around the rim or felly and preferably T shape in cross section so that the base of the coil is provided with laterally projecting branches —11— riding between the sections —4— of the rim and normally engaging the inner faces of the annular flanges —8— under the tension of the spring coil.

The tread portion of the coil is enlarged transversely to a greater width than its base to form lateral projections —12— overhanging the rim flanges —8— and normally spaced some distance therefrom to allow a limited inner radial movement of all portions of the coil under load against the normal tension of the coil tending to expand the same.

The spring coil is preferably continuous—that is it is made of a single piece of wire bent in the form shown and having its ends secured together by brazing or other fastening means and when free from engagement with the rim flanges —8— tends to expand to a considerably greater diameter than the extreme diameter of the wheel when in actual use, as shown by the dotted lines —a— and —a'—, which indicate the outer and inner faces of the coil when thus expanded.

In assembling the coil upon the rim one of the rim sections —4— is removed and the spring is then compressed by moving its convolutions closer together and interlocking one of the lateral projections —11— at the base with the adjacent rim flange —8—; whereupon the other rim section —4— is placed in operative position in interlocking engagement with the other lateral projection —11— and clamped in place by the bolts —7— passing through the felly —3—, thus holding the coil against its natural tendency to spring outwardly, and at the same time permitting inward radial movement of all portions of the coil by reason of the intervening space between the base of the coil and flanges —5—.

The portions —13— of the coil between the inner lateral projections —11— and outer lateral projections —12— are preferably parallel and are spaced apart a distance less than the transverse width of the base so that their outer edges lie in close proximity and ride against the inner edge of the flanges —8— as the tire moves radially under load. These intermediate portions which may be termed the web of the tire coöperate with the inner edges of the rim flanges —8— to guide the tire in its radial movement. The flanges —8— also serve to hold the tire against lateral displacement.

The tread portions, as —14—, of the coil are convex in cross section, the purpose of which is to afford a certain amount of resiliency, particularly in case the load should be sufficient to cause the base of the tire to rest upon the flanges —5—, the overhanging portions —12— of the coil also serving to afford additional resiliency under the same circumstances.

In some instances, particularly in the heavier machines, such as trucks, the space within the coil and between the convolutions may be filled by a filling —15— of soft rubber or other suitable resilient material which, in addition to stiffening the coil as a whole, also serves to hold the convolutions in nearly uniform spaced relation and tends to deaden independent vibration of said convolutions, thereby reducing the possibility of noise from rattle to a minimum.

The opposite circular side pieces —4— form an annular channel in the rim in which the tire —9— is guided in its radial movement, and while in some instances the wire coil in itself may perform all the functions of a tire, yet the resilient filler —15— extending, as it does between the convolutions of the coil, produces additional resistance to further compression of such coil under load, thus increasing the resistance to inward or radial depression at all points, but still maintaining a sufficient degree of resiliency to prevent transmission of the vibrations of the tire to the running gear or body of the vehicle in passing over obstructions and uneven road surfaces.

In Fig. 4, the wire of the tread is provided with a series of bends forming corrugations —16— adapted to increase the "non-skid" properties of the tire.

The tire here disclosed is adapted for use with any suitable form of rim or wheel, and I do not desire to limit myself to its use in the specific combination shown, as many changes, variations and modifications may be made, so long as the essential annular channel in which the tire moves is retained, without departing from the spirit of this invention as set forth in the appended claims.

What I claim is:—

1. In a vehicle wheel of the character described, the combination of a rim having an annular channel, a tire comprising a coil spring extending circumferentially around the rim and T-shape in cross section and having a portion radially movable in said annular channel, said rim having inturned flanges engaging with the base of the coil.

2. In a vehicle wheel, the combination of a rim having an annular channel with a tire comprising a coil spring extending circumferentially around the rim, each coil unit formed with substantially parallel side portions and enlarged base and tread portions, said base positioned in and of less radial depth than the channel in the rim and slidable radially in said channel to allow the tire to yield inwardly at all points.

3. In a vehicle wheel, the combination with a rim having an annular channel formed with inwardly projecting annular flanges of a tire comprising a coil spring extending circumferentially around the rim, each coil of said spring being substantially T-shaped in cross section and having its lateral base projections positioned in and of considerably less radial depth than the rim channel and confined beneath said rim flanges, the opposite sides of each coil being substantially parallel and spaced apart a sufficient distance to slidably contact with the rim flanges while permitting the tire to yield radially and inwardly at all points.

4. In a vehicle wheel of the character described, the combination of a rim having an annular channel and opposite inturned annular flanges and a tire comprising a coil spring extending circumferentially around the rim and between said flanges and radially movable in said annular channel, said coil having a base wider than the opening between said flanges, and a resilient filler within the coil spring.

In witness whereof I have hereunto set my hand this 21st day of February, 1916.

HENRY J. STEIGERWALD.

Witnesses:
E. A. THOMPSON,
VIOLA HOWLAND.